June 7, 1932.  M. C. TERRY ET AL  1,862,285
RUBBER DOOR GASKET
Filed Sept. 6, 1930
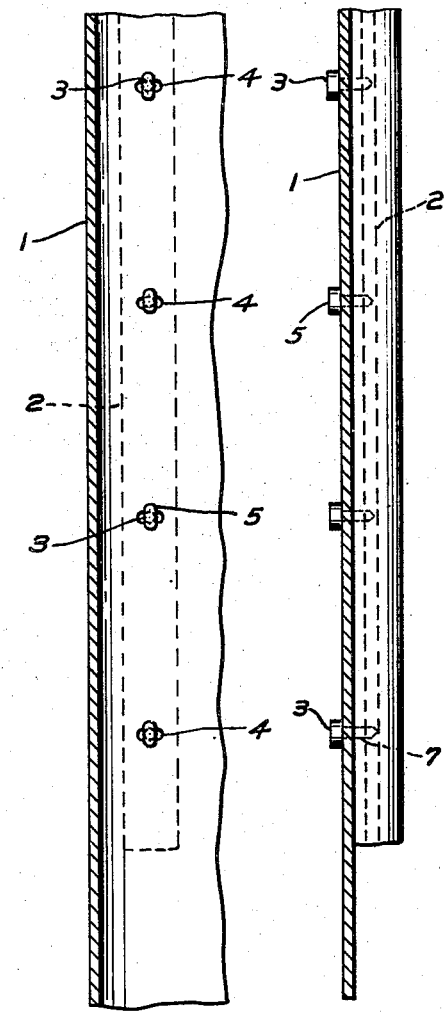
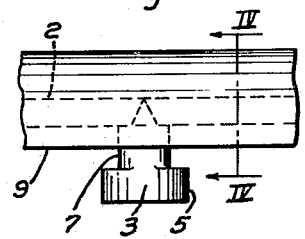
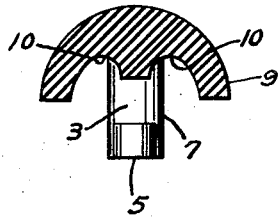
INVENTORS
Matson C. Terry &
Herman E. Pleasant
BY
ATTORNEY Patented June 7, 1932

1,862,285

UNITED STATES PATENT OFFICE

MATSON C. TERRY, OF MANSFIELD, OHIO, AND HERMAN E. PLEASANT, OF ROCKFORD, ILLINOIS, ASSIGNORS TO WESTINGHOUSE ELECTRIC AND MANUFACTURING COMPANY, A CORPORATION OF PENNSYLVANIA

RUBBER DOOR GASKET

Application filed September 6, 1930. Serial No. 480,098.

This invention relates to sealing strips or gaskets and particularly to flexible gaskets to be applied to sheet-metal surfaces, such as are customarily provided for refrigerator doors.

An object of the invention is to provide a flexible gasket which may be quickly applied to, or removed from, a refrigerator door.

A further object is to provide a flexible gasket that may be applied to, or removed from, a door without the use of tools or special equipment, by providing the gasket with a plurality of projections which may be turned to fit a perforation in the metal surface and which will hold the gasket in place when in normal position.

Other objects and advantages of this invention will be apparent from the following description and accompanying drawing, wherein:

Figure 1 is a front elevational view, partly in section, showing the gasket affixed to a metal carrying member or door.

Fig. 2 is a side elevation view, partly in section, showing the construction of the fastening means.

Fig. 3 is a fragmentary view, on an enlarged scale, of a portion of the gasket showing a single fastening means, and Fig. 4 is a cross sectional view, taken on the line IV—IV of Fig. 3.

In the drawing, 1 designates the sheet-metal member, for example, the inwardly flanged portion of a refrigerator door, to which the gasket is applied.

The gasket 2 may be semi-cylindrical in shape and is preferably made of elastic material, such as soft rubber. A plurality of studs 3 are molded integrally with the gasket at spaced intervals. These studs extend through cooperating perforations 4 provided in the sheet-metal member 1 and retain the gasket in position against this member, in a manner hereinafter described.

Each stud comprises a neck 7, and an oblong head 5 somewhat smaller than the perforation 4 and extending normally in a direction transverse to its cooperating perforation. The perforation 4 is slightly wider than the head 5 so that the head may slide easily through the perforation when the stud 3 is turned to have the proper axial relation thereto. When the head 5 goes back to its normal position, after being inserted through the perforation, it cannot slide out of the perforation unless again turned to correspond axially thereto.

The gasket 2 is preferably semi-cylindrical in cross section and is provided with two recesses 10, permitting the side portions 9 to meet the sheet-metal members 1 squarely, thereby effectively sealing the cooling compartment when the door is closed and the gasket compressed and also constituting a cushion for the door. The studs 3 are located on the gasket at spaced intervals which are preferably a little shorter than the spaces between the perforations, whereby the resilient properties of the gasket will hold it taut.

The neck 7 of the stud 3 is of sufficient length to allow for the thickness of the metal member to which the gasket is attached.

The operation of the attaching means is apparent from the drawing. When the stud 3 is turned so that the head 5 corresponds axially to the perforation 4, the head will slip into the perforation. When the stud is released, the long axis of the head will be transverse to the perforation and thus be held firmly to the metal member. This is a simple operation because of the resilient material utilized and may be accomplished without the use of any tools.

While we have illustrated and described a specific embodiment of our invention, it will be apparent that other forms may be adopted, all coming within the scope of the appended claims.

We claim as our invention:—

1. A gasket, adapted to be applied to a carrying member provided with non-circular perforations, said gasket having a body portion and a plurality of securing portions, each securing portion having substantially the same shape as its corresponding perforation and extending, when applied to the carrying members, in a direction transverse to said perforations.

2. In combination, a carrying member provided with a plurality of non-circular perforations, a gasket adapted to be applied to said member, means for fastening the gasket to said member, said means comprising a plurality of securing portions projecting from the gasket, said projecting portions having heads of substantially the same shape as said perforations and extending normally in a direction transverse thereto but adjustable to axially conform thereto.

3. In a gasket construction, the combination of a carrier member provided with a plurality of non-circular perforations, a flexible gasket adapted to be applied to said member, and means for fastening the gasket to the member, said means comprising studs projecting from the gasket and each stud having neck and head portions, the head portions being shaped to pass through the perforations without deformation in the assembling position of the strip and to underlap the edge of the perforations in normal position of the strip.

4. In combination, a carrier member provided with a plurality of non-circular perforations, a gasket adapted to be applied to said member, and means for fastening the gasket to said member, said means comprising a plurality of securing portions projecting from the gasket, said portions having heads adapted to pass through the perforations without deformation in the assembling position of the strip and to underlap the edge of the perforations in the normal position of the strip.

In testimony whereof, we have hereunto subscribed our names this 22 day of Aug., 1930.

MATSON C. TERRY.
HERMAN E. PLEASANT.